United States Patent Office 3,839,418
Patented Oct. 1, 1974

3,839,418
MANUFACTURE OF ESTERS
Roy Cyril Hinton, Donvale, Victoria, Australia, and Albert Edward Kay, Denis Pemberton, and Alan Cyril Tucker, Manchester, England, assignors to Imperial Chemical Industries Limited, London, England
No Drawing. Filed Dec. 8, 1970, Ser. No. 96,252
Claims priority, application Great Britain, Dec. 8, 1969, 59,717/69
Int. Cl. C07c 69/66, 69/72, 69/76
U.S. Cl. 260—483          11 Claims

ABSTRACT OF THE DISCLOSURE

C-monoalkylacylacetic esters are obtained by simultaneous hydrogenation and condensation of mixtures of acylacetic esters and aldehydes in presence of condensation and hydrogenation catalysts.

This invention relates to a process for the manufacture of esters and more particularly of monoalkyl derivatives of acylacetic esters.

Acylacetic esters, especially acetoacetic esters, in which the methylene group is substituted by one alkyl group are of value as intermediates for the manufacture of fungicidal and insecticidal pyrimidine compounds. These alkylated acetoacetic esters may be prepared by reaction of e.g. sodioacetoacetic esters with an alkyl bromide or iodide but this route is not attractive owing to the cost of the iodide or bromide, the low output resulting from the dilute solutions usually necessary, and the tendency to form some dialkylated compounds.

An alternative method of preparation is to condense the acetoacetic ester with an aldehyde to give an alkylidene compound which is then hydrogenated to the alkyl derivative. This method is not suitable for the preparation of methylated acetoacetic esters owing to the tendency of the intermediate methylidene compound to polymerise or undergo other side reactions, and is not entirely satisfactory for the preparation of the higher alkylated compounds since the formation of the alkylidene compound is reversible and high yields of these are only obtained if special measures, such as removal of water as it is formed, are adopted. The process of the present invention affords these alkylated acylacetic esters in good yield by a readily operated process.

According to the invention there is provided a process for the manufacture of α-alkylacylacetic esters which comprises hydrogenating in presence of a hydrogenation catalyst a mixture of an acylacetic ester, an aldehyde, and a condensation catalyst.

As hydrogenation catalysts there may be mentioned any conventional hydrogenation catalyst which is active at the moderate temperatures suitable for the process of the invention. Suitable catalysts include palladium, platinum, rhodium, cobalt or ruthenium supported on silica, alumina or carbon and Raney nickel. In the case of 3% palladium supported on carbon amounts of from 0.1 to 2.0% of the weight of aldehyde and acylacetic ester are usually satisfactory, but in the case of introducing a methyl group by the use of formaldehyde it is desirable to use up to 6% of catalyst.

As acylacetic esters there are mentioned for example benzoylacetic esters, propionylacetic esters, and especially acetoacetic esters.

The nature of the esterifying group does not in general affect the reaction but will in general be a lower alkyl group, especially ethyl. The group may however be cycloalkyl such as cyclohexyl or aryl such as m-cresyl. It is of course desirable to avoid groups which are not inert to the reaction conditions.

As aldehydes there are mentioned for example any aldehyde free from groups other than the aldehydo group which are not inert to the reaction conditions, for example formaldehyde as such or in any of its polymeric forms, acetaldehyde, n-butyraldehyde, isobutyraldehyde, benzaldehyde, phenylacetaldehyde and furfuraldehyde, and dialdehydes, such as malondialdehyde, succindialdehyde and glutardialdehyde. The aldehydes may be used in the form of their acetals, such as 1,1,3,3-tetraethoxypropane, and cyclic acetals such as 2,5-dimethoxytetrahydrofuran and 2-ethoxy-3,4-dihydropyran. Unsaturated aldehydes, such as crotonaldehyde and cinnamaldehyde may be used, but in these cases the olefinic double bonds are reduced during the process.

As condensation catalysts there may be mentioned any catalyst conventionally used to bring about reaction of aldehydes with active methylene groups, for example basic catalysts such as ammonia, or amines, e.g., piperidine or diethylamine optionally in the form of salts with organic acids such as acetic, butyric or oxalic acid, other basic salts such as sodium acetate, other salts known to act as catalyst in this type of condensation such as potassium fluoride, basic ion-exchange resins, and acid catalysts, including catalysts of the Friedel-Crafts type, such as zinc chloride, zinc acetate, magnesium chloride, barium chloride, ferric chloride, aluminium chloride, or acetic acid.

The amount of catalyst used depends upon the type of catalyst. Basic catalysts are conveniently used in amount between 0.05 and 5.0% (calculated as free base), or preferably between 0.2 and 2.0%, of the weights of aldehyde and acylacetic ester combined. Acid catalysts are preferably used in somewhat greater proportions and it is often convenient to use a solution of a salt as zinc chloride in acetic acid.

The process may be carried out conveniently at any temperature between 20 and about 120° C. Higher temperatures may be used but tend to cause side reactions. It is frequently preferable to commence the reaction at a low temperature, for example 0 to 50° C., and then complete the hydrogenation at a temperature near 80° C.

The process requires equimolecular proportions of aldehyde groups and acylacetic ester but it is usually preferable to use a slight, for example 5–10%, excess of aldehyde to ensure complete conversion of the acylacetic ester. Proportions differing from these may be used with some loss in efficiency.

The process may be carried out by mixing the reactants and catalysts and simultaneously or within a short time adding the hydrogen. It is frequently advantageous to control the reaction by regulated addition of either or both of the reactants or the condensation catalyst as the reaction proceeds. The hydrogen may be passed through the reaction mixture or the reaction mixture may be stirred under an atmosphere of hydrogen, preferably at superatmospheric pressure, further hydrogen being if desired added as necessary to maintain the pressure.

If desired the process may be carried out in a solvent such as ethanol or acetic acid, a solvent of the latter type acting also as a condensation catalyst. Water may be present, especially for example when formaldehyde is used as the aldehyde.

The product may be isolated for example by removing the insoluble hydrogenation catalyst by filtration and distillation of the filtrate under reduced pressure.

The invention is illustrated but not limited by the following Examples in which all parts and percentages are by weight unless otherwise stated.

EXAMPLE 1

7.5 Parts of n-butyraldehyde are added to a stirred mixture of 13 parts of ethylacetoacetate, 0.086 parts of piperidine and 0.125 parts of a 50% aqueous paste of a 3% palladium on carbon catalyst in a closed container at a temperature kept below 5° C. Hydrogen is then passed into the reaction vessel to a pressure of 30 p.s.i. After 100 minutes the hydrogen absorption decreases and a further 0.032 parts of piperidine are added and further hydrogen as necessary to maintain the pressure. After 20 minutes the temperature is raised to between 80 and 85° C. over 125 minutes and held there for 65 minutes. The mixture is cooled, catalyst removed by filtration and water by separation, and the remainder distilled to give 17.0 parts of ethyl α-butylacetoacetate, analysing at 94% strength, boiling at 120–130° C. under a pressure of 25–28 mm. of mercury.

EXAMPLE 2

Hydrogen is passed into a stirred mixture of 13 parts of ethyl acetoacetate, 3 parts of paraformaldehyde, 0.6 parts of zinc chloride, 20 parts of acetic acid and 1 part of 3% palladium on carbon catalyst as a 50% aqueous paste at a temperature between 40 and 45° C. After 165 minutes the temperature is raised at 60° C. and held at that temperature for 45 minutes. The mixture is cooled, filtered to remove the catalyst, and distilled to afford 8 parts of ethyl α-methylacetoacetate, analysing to afford 8 parts of ethyl α-methylacetoacetate, analysing at least 91% strength, boiling at 78–80° C. at a pressure of 19–21 mm. of mercury.

EXAMPLE 3

Hydrogen is passed into a stirred mixture of 26 parts of ethyl acetoacetate, 6 parts of paraformaldehyde, 1 part of zinc acetate dihydrate, 4 parts of acetic acid and 1.5 parts of 3% palladium on carbon catalyst as a 50% aqueous paste at a temperature between 45 and 50° C. for 5 hours. The mixture is then cooled, filtered to remove catalyst and extracted with 30 parts of ether. The remaining organic layer is distilled to give 11.9 parts of ethyl α-methylacetoacetate of 96% strength.

EXAMPLE 4

27.5 parts of ethylacetoacetate and 27.5 parts of 23% aqueous formaldehyde are simultaneously added dropwise to a stirred mixture of 10 parts of water, 4 parts of acetic acid, 1 part of zinc acetate dihydrate and 1.5 parts of 3% palladium on carbon catalyst as a 50% aqueous paste at a temperature between 30 and 35° C. Hydrogen is passed through the mixture during the period of addition and for a further 45 minutes. The mixture is cooled, filtered to remove catalyst and the filtrate extracted with ether. The ether extract is distilled to give 17.5 parts of ethyl α-methylacetoacetate of 94% strength.

EXAMPLE 5

0.2 Parts of a 5% solution of piperidine in methanol is added to a stirred mixture of 6.8 parts of ethyl acetoacetate, 3.3 parts of n-butyraldehyde, 8 parts of methanol and 0.04 parts of 3% palladium on carbon catalyst as a 50% aqueous paste under hydrogen at atmospheric pressure. A further 1 part of piperidine solution is added in four equal portions, over a period of 5 hours. Hydrogen is added as necessary to maintain the pressure at atmospheric. When the reaction is complete as shown by cessation of hydrogen uptake, the mixture is filtered to remove the catalyst and evaporated up to a temperature of 70° C. under a pressure of 20 mm. of mercury. 8.5 Parts of oily residue, analysing as ethyl α-butylacetoacetate of 85% strength, are obtained.

EXAMPLE 6

5 Parts of an 11% solution of piperidine acetate in ethanol are added to a stirred mixture of 66.2 parts of ethyl acetoacetate, 39.9 parts of n-butyraldehyde and 0.5 parts of 3% palladium on carbon catalyst as a 50% aqueous paste under atmospheric pressure of hydrogen and at a temperature of about 30° C. A further 7 parts of the piperidine acetate solution are added in portions over a period of 2 hours. The hydrogen pressure is maintained at atmospheric. After a further 16 hours the mixture is filtered to remove catalyst and evaporated up to a temperature of 70° C. under a pressure of 20 mm. of mercury. 97.1 Parts of oily ethyl α-butylacetoacetate of high strength, as determined by gas-liquid chromatographic analysis, are obtained.

Similar yields of high strength ethyl α-butylacetoacetate are obtained by repeating the above procedure at a temperature of 60° C. or by using an aqueous solution of piperidine oxalate instead of ethanolic piperidine acetate and a hydrogen pressure of 40 p.s.i.g.

EXAMPLE 7

2.8 Parts of a 17% solution of piperidine butyrate in ethanol are added to a stirred mixture of 16.4 parts of ethyl acetoacetate, 10.0 parts of n-butyraldehyde and 0.13 parts of 3% palladium on carbon catalyst as a 50% aqueous paste in a reaction vessel at a temperature of about 30° C. Hydrogen is then passed into the vessel to a pressure of 40 p.s.i., and is maintained at about this pressure during reaction. After 16 hours the temperature is raised to 70° C. and held there for 60 minutes. The mixture is cooled, filtered to remove the catalyst and evaporated up to a temperature of 70° C. under a pressure of 20 mm. of mercury. 23.9 Parts of oily residue, analysing as ethyl α-butylacetoacetate of 86% strength are obtained.

EXAMPLE 8

0.5 Parts of sodium acetate is added to a stirred mixture of 32.4 parts of ethyl acetoacetate, 20.3 parts of n-butyraldehyde and 0.25 parts of 3% palladium on carbon catalyst as a 50% aqueous paste. The mixture is then heated to about 70° C. under hydrogen at a pressure of 120 p.s.i. After 17 hours the mixture is worked up as in Example 7, giving 44 parts of oily product analysing as ethyl α-butylacetoacetate of 76% strength.

High yields of ethyl α-butylacetoacetate are also obtained by repeating this experiment in presence of 0.3 parts of acetic acid, or by using a mixture of 0.5 parts of triethylene diamine and 0.6 parts of acetic acid in place of the sodium acetate.

EXAMPLE 9

1 Part of 46% solution of ammonium acetate in water is added to a mixture of 65.7 parts of ethyl acetoacetate, 40 parts of n-butyraldehyde and 0.5 parts of palladium on carbon as a 50% aqueous paste. The mixture is maintained under atmospheric pressure of hydrogen for 5 hours at about 30° C. and a further 17 hours at 70° C., and is then worked up as in Example 7. 85 parts of oil, analysing as 97% ethyl α-butylacetoacetate are obtained.

High yields of ethyl α-butylacetoacetate are also obtained by a similar procedure by using either 7.5 parts of a 22% aqueous solution of diethylamine acetate or 18 parts of 33% w./w. aqueous potassium fluoride instead of the aqueous ammonium acetate.

EXAMPLE 10

2.5 parts of a 40% aqueous solution of piperidine acetate are added to a stirred mixture of 59 parts of methyl acetoacetate, 40 parts of n-butyraldehyde and 0.5 part of n-butylaldehyde and 0.5 parts of 3% palladium on carbon as a 50% aqueous paste, under atmospheric pressure of hydrogen at 22° C. Hydrogen pressure is maintained at atmospheric and when uptake ceases after 17 hours the mixture is worked up as described in Example 6, giving 85.5 parts of oil analysing as 92% methyl α-butylacetoacetate. A similar experiment but replacing the methyl acetoacetate by 2-methylcyclohexyl acetoacetate gives a good yield of high strength 2-methylcyclohexyl α-n-butyl acetoacetate.

EXAMPLE 11

2.5 Parts of a 40% aqueous solution of piperidine acetate are added to a stirred mixture of 33.1 parts of ethyl acetoacetate, 20.8 parts of *iso*-butyraldehyde and 0.25 parts of 3% palladium on carbon as a 50% aqueous paste. The mixture is then maintained under a hydrogen pressure of 100 p.s.i. and a temperature of 75° C. for six hours. On working up the product as described in Example 7 there is obtained 42 parts of an oil which on distillation yields 35 g. of pure ethyl α-*iso*-butyl-acetoacetate.

EXAMPLES 12–15

The procedure of Example 11 is repeated except that the aldehyde is added to the stirred mixture of acylacetic ester, piperidine acetate solution and palladium on carbon prior to hydrogenation. Details of reactants, reaction conditions and products are given in the table below:

| Example | Acylacetic ester | Aldehyde | 40% aqueous piperidine acetate (parts) | 30% Pd/c as 50% aqueous paste (parts) | Hydrogen (p.s.i.) | Temp. (0° C.) | Reaction time (hrs.) | Product |
|---------|------------------|----------|--------|------|-----|----|----|---------|
| 12 | Ethyl acetoacetate (26.8 parts). | Benzaldehyde (22.8 parts). | 2 | 0.25 | 100 | 70 | 20 | Ethyl α-benzyl acetoacetate. |
| 13 | Ethyl acetoacetate (13 parts). | Furfural (11 parts). | 1 | 0.25 | 100 | 70 | 23 | Ethyl α-furfuryl acetoacetate. |
| 14 | do | Pyridine-3-carboxaldehyde (12 parts). | 1.2 | 0.62 | 100 | 30 | 20 | Ethyl α-(3-picolyl) acetoacetate. |
| 15 | m-Cresyl acetoacetate (19.3 parts). | n-Butylaldehyde (8.5 parts). | 0.5 | 0.25 | 100 | 40 | 6 | m-Cresyl α-n-butyl acetoacetate. |

In Example 14, 12 parts of ethanol; and in Example 15, 20 parts of toluene were also present.

EXAMPLE 16

0.6 Parts of a 40% aqueous solution of piperidine acetate is added to a stirred mixture of 16 parts of ethyl acetoacetate, 10.4 parts of *n*-butyraldehyde and 0.25 part of 5% palladium on alumina catalyst. The mixture is maintained at about 30° C. under hydrogen pressure of 100 p.s.i. for 6 hours. On working up the product as described in Example 7 there is obtained 22.6 parts of high strength ethyl α-*n*-butylacetoacetate. In a similar experiment in which the palladium on alumina catalyst is replaced by 0.37 part of a 1% platinium on carbon catalyst, and which is maintained at 100 p.s.i. of hydrogen for 24 hours at 30° C., and for a further 4 hours at 75° C., there is obtained 21.7 parts of ethyl α-*n*-butylacetoacetate of lower strength than that obtained using palladium on alumina.

EXAMPLE 17

7.5 parts of *n*-butyraldehyde are added to a stirred mixture of 13 parts of ethyl acetoacetate, 0.126 parts of piperidine, 0.176 parts of acetic acid and 0.125 parts of a 50% aqueous paste of a 3% palladium on carbon catalyst in a closed container at a temperature kept below 30° C. Hydrogen is then passed with the reaction vessel to a pressure of 30 p.s.i. After 2 hours the hydrogen adsorption decreases and a further 0.062 parts of piperidine are added and further hydrogen as necessary to maintain the pressure. After 75 minutes the hydrogen adsorption decreases again and a further 0.062 parts of piperidine are added and further hydrogen as necessary to maintain the pressure. After 80 minutes the temperature is raised to between 80 and 85° C. over 3 hours and held then for 1 hour. The mixture is cooled, catalyst removed by filtration and water by separation and the remainder evaporated up to a temperature of 65° C. under pressure of 25 mm. of mercury to give 18.5 parts of ethyl α-butylacetoacetate, analysing at 96% strength.

EXAMPLE 18

8.375 Parts of 37% aqueous formaldehyde and a mixture of 0.176 parts of piperidine, 0.123 parts of acetic acid and 0.220 parts of water are added simultaneously dropwise to a stirred mixture of 13 parts of ethyl acetoacetate, 0.264 parts of acetic acid and 0.094 parts of 3% palladium on carbon catalyst as a 50% aqueous paste at a temperature between 40 and 50° C. Hydrogen is passed through the mixture during the addition to a pressure of 30 p.s.i. and for a further 25 minutes. The temperature is raised to between 60 and 65° C. for 25 minutes and then raised to between 95 and 100° C. for 40 minutes. The mixture is cooled, catalyst removed by filtration and water by separation and the remainder distilled to give 13.1 parts of ethyl α-methylacetoacetate boiling at 63 to 73° C. at 8 to 9 mm. mercury pressure.

A similar yield is obtained if the acetic acid and water are added initially to the mixture in the reaction vessel and neat piperidine added simultaneously with the aqueous formaldehyde.

EXAMPLE 19

13.6 Parts of 33% aqueous acetaldehyde and a mixture of 0.133 parts of piperidine, 0.107 parts of acetic acid and 2.2 parts of water are added simultaneously dropwise to a stirred mixture of 13 parts of ethyl acetoacetate, 0.207 parts of acetic acid and 0.1 part of 3% palladium on carbon catalyst as a 50% aqueous paste at a temperature between 50 and 60° C. Hydrogen is passed through the mixture during the addition of a pressure of 30 p.s.i. and for a further 45 minutes. The temperature is raised to between 100 and 105° C. for 2 hours. The mixture is cooled, catalyst removed by filtration and the ethyl α-ethylacetoacetate extracted into 8.3 parts of ether. The ether is removed by evaporation and the remainder distilled to give 12.5 parts of ethyl α-ethylacetoacetate boiling at 31° C. to 36° C. at 15 to 16 mm. mercury pressure.

EXAMPLE 20

7 Parts of crotonaldehyde are added to a stirred mixture of 13 parts of ethyl acetoacetate, 0.243 parts of piperidine, 0.4 parts of acetic acid and 0.1 parts of a 50% aqueous paste of a 3% palladium on carbon catalyst in a closed container at a temperature kept below 15° C. Hydrogen is then passed into the reaction vessel to a pressure of 30 p.s.i. After 90 minutes at a temperature between 40° C. or 45° C. the hydrogen adsorption decreases and the temperature is raised to between 60 and 65° C. for 45 minutes. A further 0.12 parts of piperidine and 0.2 parts of acetic acid are added and further hydrogen as necessary to maintain the pressure. The temperature is raised to between 60 and 65° C. over 90 minutes and held there for 30 minutes. The temperature is raised to between 95° and 100° C. for 15 minutes. The mixture is cooled, catalyst removed by filtration and the ethyl α-butylacetoacetate extracted into 8.3 parts of ether. The ether is removed by evaporation and the remainder distilled to give 8.3 parts of ethyl α-butylacetoacetate analysing at 98% strength.

EXAMPLE 21

13.2 Parts of cinnamaldehyde are added to a stirred mixture of 13 parts of ethyl acetoacetate, 0.24 parts of piperidine, 0.4 parts of acetic acid and 0.15 parts of a 50% aqueous paste of a 3% palladium on carbon catalyst in a closed container at a temperature kept below 20° C. Hydrogen is then passed into the reaction vessel to a pressure of 30 p.s.i. After 3 hours at a temperature between 50° C. and 60° C. the hydrogen adsorption decreases and the temperature is raised to between 60° C.

and 70° C. for 30 minutes. A further 0.12 parts of piperidine are added and the temperature raised to between 70° and 80° C. and maintained there for 2 hours. The mixture is cooled, filtered to remove catalyst and extracted with 12.5 parts of ether. The ether is removed by evaporation and the remainder distilled to give 12.3 parts of ethyl 2-acetyl-5 phenyl-$n$-valerate boiling at 149° C. to 157° C. at 1 to 2 mm. mercury pressure.

EXAMPLE 22

15.2 Parts of nitral are added to a stirred mixture of 13 parts of ethyl acetoacetate, 0.263 parts of piperidine, 0.185 parts of acetic acid and 0.213 parts of a 50% aqueous paste of a 3% palladium on a carbon catalyst in a closed container at a temperature kept below 15° C. Hydrogen is then passed into the reaction vessel to a pressure of 30 p.s.i. The temperature is raised to between 50° C. and 60° C. over 4 hours and held there for 1 hour and then raised to between 70° C. and 80° C. for 2 hours and to between 95° and 100° C. for 5 hours. 28.4 parts of methanol, 0.043 parts of acetic acid, 0.128 parts of piperidine and 0.107 parts of a 50% aqueous paste of a 3% palladium on carbon catalyst are added and hydrogen is then passed into the reaction vessel to a pressure of 100 atmospheres. The temperature is raised between 100° C. and 105° C. and maintained there for 12 hours. The mixture is cooled, catalyst removed by filtration and water by evaporation and the remainder distilled to give 11.6 parts of ethyl 2-acetyl-5,9-dimethyl decanoate boiling at 180° C. and 2 to 3 mm. mercury pressure.

EXAMPLE 23

7.5 Parts of $n$-butyraldehyde are added to a stirred mixture of 13 parts of ethyl acetoacetate, 1 part of Amberlite Resin 1R 45(OH), 0.51 parts of acetic acid and 3 parts of a 50% aqueous paste of a 3% palladium on carbon catalyst in a closed container or a temperature kept below 30° C. Hydrogen is passed into the reaction vessel to a pressure of 30 p.s.i. The temperature is raised to between 40° and 45° C. and held there for 10 hours and finally at between 95° and 100° C. for 2 hours. The mixture is cooled, catalyst removed by filtration and water by separation and the remainder evaporated up to a temperature of 65° C. under a pressure of 20 mm. of mercury to give 18 parts of ethyl α-butylacetoacetate, analysing at 70% strength.

EXAMPLE 24

7.5 Parts of $n$-butyraldehyde are added to a stirred mixture of 13 parts of ethyl acetoacetate, 0.245 parts of piperidine, 0.175 parts of acetic acid and 1 part of a 50% aqueous paste of Raney nickel in a closed container at a temperature kept below 30° C. Hydrogen is passed into the reaction vessel to a pressure of 30 p.s.i. The temperature rises to between 15° C. and 30° C. and is held there for 16 hours. The hydrogen absorption decreases and the temperature is raised to between 60° C. and 65° C. for 4 hours and finally to between 95° C. and 100° C. for 1 hour. The mixture is cooled, catalyst removed by filtration and water by separation and the remainder evaporated up to a temperature of 65° C. under a pressure of 20 mm. of mercury to give 15.5 parts of ethyl α-butylacetoacetate, analysing at 93% strength.

We claim:
1. A process for the manufacture of α-alkylacylacetic esters which comprises hydrogenating at 0° to 120° C. in the presence of a hydrogenation catalyst selected from the group consisting of palladium, platinum, rhodium, cobalt or ruthenium supported on silica, alumina, carbon or Raney nickel, a mixture of an acylacetic ester selected from the group consisting of alkyl esters of lower alkanoylacetic and benzoylacetic acids, an aldehyde of the formula RCHO where R is hydrogen or alkyl, and a condensation catalyst conventionally used to bring about reaction of aldehydes with active methylene groups and selected from the group consisting of ammonia, amines, salts of amines with carboxylic acids, ammonium acetate, sodium acetate, potassium fluoride, basic ionic exchange resins and Friedel-Crafts catalysts.

2. A process as claimed in claim 1 wherein the alkyl group in the ester is lower alkyl and the aldehyde is one having the formula RCHO where R is hydrogen or alkyl.

3. The process of claim 2 wherein the alkyl group is ethyl and R is hydrogen or butyl.

4. A process as claimed in claim 2 wherein the aldehyde, acylacetic ester and catalysts are first mixed and the hydrogen is added thereafter.

5. A process as claimed in claim 2 wherein the process is controlled by addition of at least one of the aldehyde and acylacetic ester or condensation catalyst as the reaction proceeds.

6. A process as claimed in claim 2 which is carried out at temperatures between 20 and 120° C.

7. A process as claimed in claim 2 wherein the aldehyde is used in slight molar excess of the acylacetic ester.

8. A process as claimed in claim 2 wherein the aldehyde is formaldehyde.

9. A process as claimed in claim 2 wherein the aldehyde is $n$-butylaldehyde.

10. A process as claimed in claim 2 wherein the condensation catalyst is an amine or sodium acetate.

11. A process as claimed in claim 2 wherein the condensation catalyst is a Friedel-Crafts catalyst.

References Cited

UNITED STATES PATENTS 2,305,558  12/1942  Roblin, Jr. et al. _____ 260—483
2,438,894   4/1948  Boise, Jr. _____ 260—483

VIVIAN GARNER, Primary Examiner

U.S. Cl. X.R.

260—295.5 R, 347.4, 410.9 R, 476 R, 479 S